(12) United States Patent
Kim et al.

(10) Patent No.: US 6,986,609 B2
(45) Date of Patent: Jan. 17, 2006

(54) OPTICAL MODULE AND METHOD FOR MANUFACTURING THE SAME

(75) Inventors: Sang-chae Kim, Suwon (KR); Hyung Choi, Seongnam (KR); Yong-sung Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 190 days.

(21) Appl. No.: 10/138,719

(22) Filed: May 6, 2002

(65) Prior Publication Data

US 2002/0172474 A1    Nov. 21, 2002

(30) Foreign Application Priority Data

May 8, 2001   (KR) ............................... 2001-24955
Sep. 20, 2001  (KR) ............................... 2001-58362

(51) Int. Cl.
*G02B 6/42* (2006.01)
*B32B 3/00* (2006.01)
*C23F 1/00* (2006.01)

(52) U.S. Cl. .............................. 385/88; 216/2; 438/27; 385/14

(58) Field of Classification Search .................. 385/88, 385/14, 49; 216/2; 257/E25.032; 156/644.1; 438/27, 65, 977

See application file for complete search history.

(56) References Cited

U.S. PATENT DOCUMENTS 5,611,006 A * 3/1997 Tabuchi ..................... 385/14
5,738,757 A   4/1998 Burns et al.

(Continued)

FOREIGN PATENT DOCUMENTS

DE    41 01 043 A1    8/1992

OTHER PUBLICATIONS

Japanese Abstract No. 01094305, dated Apr. 13, 1989.

(Continued)

*Primary Examiner*—Brian Healy
*Assistant Examiner*—James P. Hughes
(74) *Attorney, Agent, or Firm*—Sughrue Mion, PLLC

(57) ABSTRACT

An optical module, in which one or more grooves on which a plurality of optical fibers or optical parts are mounted, are formed to different depths and a stopper hole is manufactured so as to prevent a convex corner phenomenon so that an optical axis is precisely aligned, and a method of manufacturing the same are provided. The method of manufacturing an optical module includes the steps of first etching to form one or more grooves on a first surface of a wafer, and second etching to form one or more stopper holes so that a second surface of the wafer is etched to penetrate the wafer. The optical module having one or more grooves for mounting one or more optical parts on a substrate, includes stopper holes which are formed by penetrating the bottom surface of the substrate to center a region which corresponds to a predetermined region among the grooves.

17 Claims, 11 Drawing Sheets

U.S. PATENT DOCUMENTS

| | | | |
|---|---|---|---|
| 6,201,629 B1 | 3/2001 | McClelland et al. | |
| 6,227,723 B1 * | 5/2001 | Masuda et al. | 385/88 |
| 6,262,827 B1 | 7/2001 | Ueda et al. | |
| 6,448,505 B1 * | 9/2002 | Hiraoka et al. | 174/260 |
| 2004/0165856 A1 * | 8/2004 | Steinberg | 385/137 |

FOREIGN PATENT DOCUMENTS

| | | | |
|---|---|---|---|
| EP | 0 674 194 A2 | | 9/1995 |
| JP | 09-090177 | * | 4/1997 |

OTHER PUBLICATIONS

Philippe Helin, et al.; Self-Aligned Micromachining Process for Large-Scale, Free-Space Optical Cross-Connects; Journal of Lightwave Technology, vol. 18, ; No. 12; Dec. 2000; pp. 1785-1791.

Japanese Abstract No. 2001013443, dated Jan. 19, 2001.

Japanese Abstract No. 57158824, dated Sep. 30, 1982.

* cited by examiner

OPTICAL MODULE AND METHOD FOR MANUFACTURING THE SAME

BACKGROUND OF THE INVENTION

1. Field of the Invention

The present invention relates to an optical module and a method for manufacturing the same, and more particularly, to an optical module, in which one or more grooves, in which are mounted a plurality of optical fibers or optical parts are formed to different depths and a stopper hole is manufactured so as to prevent a convex corner phenomenon so that an optical axis is precisely aligned, and a method for manufacturing the same.

2. Description of the Related Art

Recently, transmission methods in an optical communication system have been replaced by wavelength division multiplexing (WDM) transmission methods, with increase in transmission data in an optical communication network. As connection between networks is required in the WDM system, an optical crossing connector (OXC), that is, an optical module, is an essential element.

Referring to FIG. 1A, the optical module includes a micro-mirror 10, an actuator 15 for driving the micro-mirror 10, an input optical fiber 20 for transmitting an optical signal to the micro-mirror 10 around the actuator 15, an output optical fiber 22 for receiving an optical signal reflected from the micro-mirror 10 and transmitting the optical signal, and an optical module 30 in which ball lenses 25 and 27, aligned for focusing light, are arranged between the input and output optical fibers 20 and 22 and the micro-mirror 10. The input and output optical fibers 20 and 22 are arranged in the V-grooves 35, and the ball lenses 25 and 27 are arranged in micro-pits 40 which communicate with the V-groove 35. The optical fibers 20 and 22, the ball lens 25, and the micro-mirror 10 are all aligned with an optical axis.

In the optical module having the above structure, an optical signal transmitted from the input optical fiber 20 passes through the ball lens 25, is reflected by the micro-mirror 10, passes through the ball lens 27, and is output through the output optical fiber 22 and transmitted to a predetermined place. The ball lenses 25 and 27 focus the optical signal to reduce optical loss and to minimize the optical path.

As shown in FIG. 1B, a convex corner 45 is formed in a portion where a hole 17 for installing the actuator 15 is connected to the micro-pit 40 and the micro-pit 40 is connected to the V-grooves 35. Since the sizes of the actuator 15, the ball lenses 25 and 27, and the optical fibers 20 and 22 are different, the depths of the hole 17, the V-groove 35, and the micro-pit 40 for receiving these elements must be different in order to align their centers on the optical axis.

However, when manufacturing the optical module having the above structure by etching, the optimum conditions for etching such as time or temperature, are different according to the width or depth of the groove to be etched. In other words, since the hole 17, the V-groove 35, and the micro-pit 40 have different widths and depths, etching must be performed under different conditions for the hole 17, the V-groove 35, and the micro-pit 40. However, in the prior art, etching is performed by patterning once, under the ideal conditions for only one of the hole 17, the V-groove 35, and the micro-pit 40, or under conditions which are the average of the ideal conditions for the hole 17, the V-groove 35, and the micro-pit 40. Thus, in this case, the conditions for etching are not appropriate for the other regions except for the groove when the groove is a standard, and etching cannot be performed as patterned; defects in etching occur even under the average conditions.

In particular, a convex corner phenomenon in which the shapes of the micro-pit 40 or the hole 17 are not precisely etched and their pattern shapes are damaged, occurs in the convex corner 45 of the micro-pit 40 or the hole 17. FIG. 1B illustrates that the patterns of the convex corners 45 before etching are greatly damaged after etching. Due to damage of the convex corner 45, the standard of correct dimensions as designed cannot be obtained, and thus, the arrangement of optical elements such as the optical fibers 20 and 22, or the ball lenses 25 and 27, varies. As a result, the optical axes of the elements are not aligned, and thus, the optical signal cannot be precisely transmitted, thereby causing optical loss.

Thus, in order to prevent damage to patterns caused by the convex corner effect, specific corner compensation patterns 50 and 52 as shown in FIG. 2 are required. That is, in consideration of the convex corner effect, compensation patterns for supplementing are formed on an etching mask 65 so that the phenomenon during etching is suppressed, allowing the optical module to be manufactured with the desired shape. Here, reference numerals 17' and 40' denote a hole area and a micro-pit area, which are formed in the etching mask 65, respectively.

A method for manufacturing an optical module using the corner compensation patterns 50 and 52 will be described as follows.

As shown in FIGS. 3A and 3B, silicon dioxide ($SiO_2$) 63 is coated on a upper silicon wafer 60 of (100) in which both surfaces of the upper silicon wafer 60 are polished, and silicon nitride ($Si_3N_4$) 65 is deposited on both surfaces of the upper silicon wafer 60 using a low pressure chemical vapor deposition (LPCVD) method so that silicon dioxide 63 can be used as a silicon etching mask on the upper silicon wafer 60. Next, as shown in FIG. 3C, silicon nitride ($Si_3N_4$) layers 65 on both surfaces of the upper silicon wafer 60 are patterned by a reactive ion etching (RIE) process. The corner compensation patterns 50 and 52 are added to the silicon nitride ($Si_3N_4$) layers 65 so that the pattern shapes are not damaged by the convex corner effect during etching.

Also, as shown in FIGS. 4A and 4B, silicon oxide (SiO) 72 and silicon nitride ($Si_3N_4$) 75 are sequentially deposited on a lower silicon wafer 70 and are patterned by the RIE process, as shown in FIG. 4C.

Next, anisotropic wet etching of the upper and lower silicon wafers 60 and 70 is performed using a KOH aqueous solution, thereby forming a V-groove area 67, a micro-pit area 68, and hole areas 69 and 69', as shown in FIGS. 3D and 4D. The upper and lower silicon wafers 60 and 70 are bonded together, as shown in FIGS. 5A and 5B.

The actuator 15 for a micro-mirror is installed in the hole 17 of the optical module, and the optical fibers 20 and 22, and the ball lenses 25 and 27 are installed respectively in the V-groove 35 and the micro-pit 40, to be aligned with the optical axis.

At present, the optical module is manufactured by the above-mentioned manufacturing process, using the corner compensation patterns 50 and 52. However, the corner compensation patterns 50 and 52 are appropriate only when there is a minor difference in depth between the V-groove 35 and the micro-pit 40, and their length should be three times the etching depth. The corner compensation patterns 50 and 52 complicate and enlarge the entire patterns for manufacturing the optical module.

Also, if the location of the optical axis is changed, the depth of etching must also be changed, requiring new compensation patterns. In other words, the compensation patterns 50 and 52 must be designed according to the width or depth of the micro-pit 40 or the hole 17. Thus, whenever the optical axis varies, new compensation patterns must be prepared.

In particular, since the compensation patterns 50 and 52 become complicated where input/output terminals of the optical fibers are adjacent, or where the convex corner effect occurs greatly, the optical path cannot be minimized, causing optical loss due to differences in the optical path. Furthermore, as the number of channels of the optical module increases, it is difficult to form the compensation patterns, and part of the convex corner 45' can be damaged, even though the compensation patterns are used, as shown in the photo of FIG. 6, and thus the requirements for miniature optical elements cannot be satisfied.

SUMMARY OF THE INVENTION

To solve the above problem, it is an object of the present invention to provide an optical module, in which one or more grooves of different depths are included so as to prevent a convex corner phenomenon without compensation patterns, and a substrate is passed through the grooves or etched to a predetermined depth to form a stopper hole, and a method for manufacturing the same.

Accordingly, to achieve the above object, according to one aspect of the present invention, there is provided a method for manufacturing an optical module. The method includes the steps of first etching to form one or more grooves on a first surface of a wafer, and second etching to form one or more stopper holes so that a second surface of the wafer is etched to penetrate the wafer.

The method further includes the steps of depositing first etching mask layers on the first and second surfaces of the wafer, patterning one or more groove areas on the first etching mask layer on the first surface of the wafer, to form a first pattern, first etching the first pattern from the first surface of the wafer according to the first pattern, depositing a second etching mask layer on the second surface of the wafer and patterning at least one stopper hole area to form a second pattern, and second etching the second pattern so that the second surface of the wafer is etched to penetrate the wafer according to the second pattern.

A V-groove area for mounting an optical fiber, a micro-pit area for mounting optical parts, and a hole area for assembling an actuator are exposed by patterning, in the step of patterning to form a first pattern.

The V-groove area, the micro-pit area, and the hole area are etched to different depths, in the step of first etching.

The first etching mask layers are formed of silicon dioxide ($SiO_2$) or silicon nitride ($Si_3N_4$).

The second etching mask layer is formed of silicon dioxide ($SiO_2$), aluminum (Al), or a photoresist.

The first etching is wet etching selectively using KOH, $NH_4OH$, or $(CH_3)_4NOH$.

The second etching is performed by one or more selected from dry etching, sand blasting, and laser drilling.

A wet etching mask layer is further deposited on the second etching mask layer.

The method further includes, before second etching, the step of depositing Al or oxide or a photoresist on the first surface of the wafer.

To achieve the above object, according to another aspect of the present invention, there is provided a method for manufacturing an optical module. The method includes the steps of first etching to form one or more grooves on a first surface of a wafer, and second etching to form one or more stopper holes so that the first surface of the wafer is etched to penetrate the wafer or is etched to a predetermined depth.

To achieve the above object, according to another aspect of the present invention, there is provided an optical module having a substrate, a V-groove for mounting an optical fiber on the substrate, a micro-pit for mounting optical parts, and a hole for assembling an actuator. The optical module includes a first stopper hole formed to communicate with the V-groove and the micro-pit, in which the substrate is penetrated in a vertical direction, and a second stopper hole formed to communicate with the micro-pit and the hole, in which the substrate is penetrated in a vertical direction.

To achieve the above object, according to another aspect of the present invention, there is provided an optical module having one or more grooves for mounting one or more optical parts on a substrate. The optical module includes stopper holes which are formed by penetrating the bottom surface of the substrate which corresponds to a predetermined region among the grooves.

To achieve the above object, according to another aspect of the present invention, there is provided a method of manufacturing an optical module. The method includes the steps of first etching to form one or more stopper holes so that the bottom surface of a wafer is etched to penetrate the wafer, and second etching to form one or more grooves for mounting optical elements on the top surface of the wafer.

BRIEF DESCRIPTION OF THE DRAWINGS

The above objects and advantages of the present invention will become more apparent by describing in detail preferred embodiments thereof with reference to the attached drawings, in which.

DETAILED DESCRIPTION OF THE INVENTION

Figure 1A:
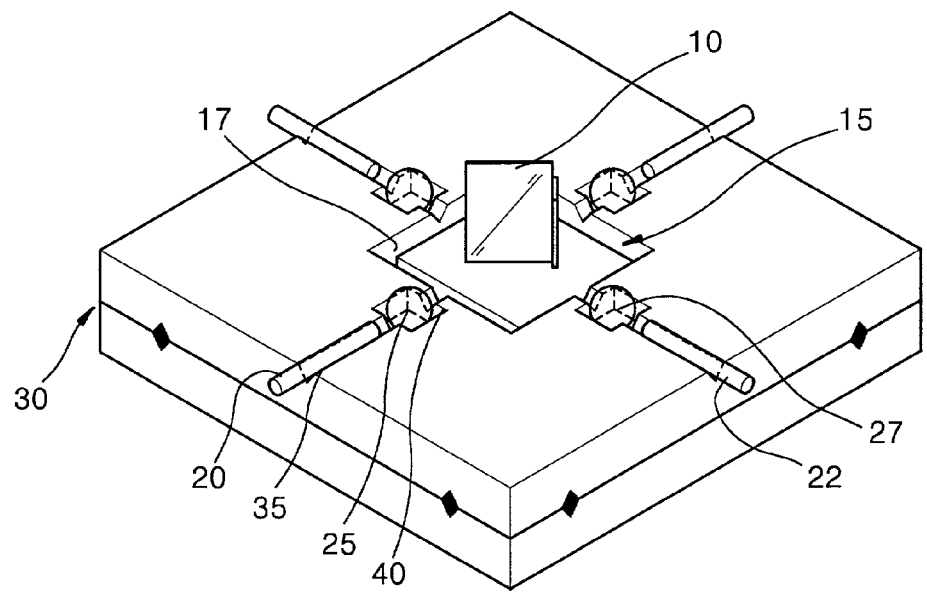
FIG. 1A is a schematic diagram of a conventional optical module.
Figure 1B:
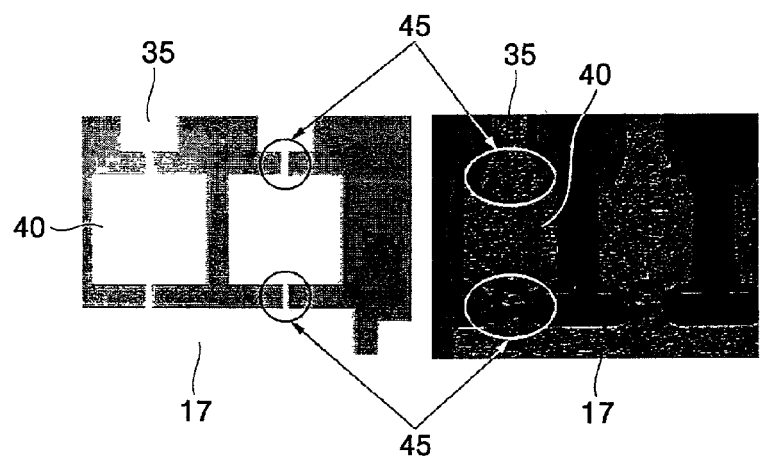
FIG. 1B compares the state of the conventional optical module before and after etching.
Figure 2:
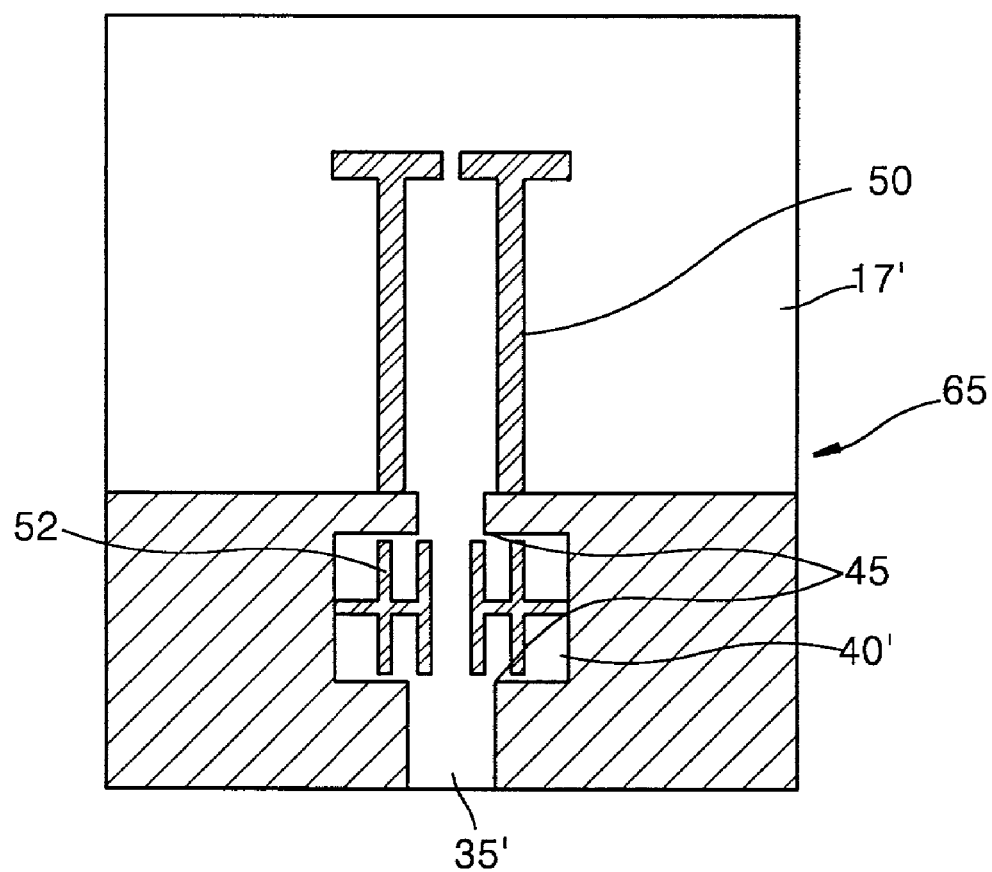
FIG. 2 illustrates a case where a convex corner compensation pattern is formed during the manufacture of the conventional optical module.
Figure 3A:
FIGS. 3A through 3D illustrate the process of manufacturing the conventional optical module.
Figure 3B:
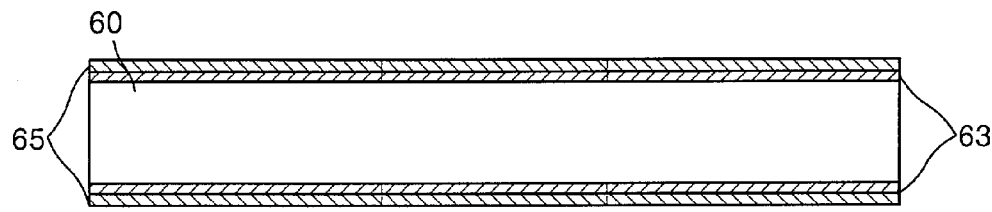
Figure 3C:
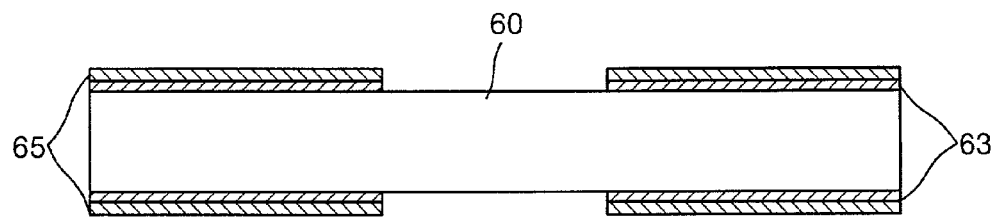
Figure 3D:
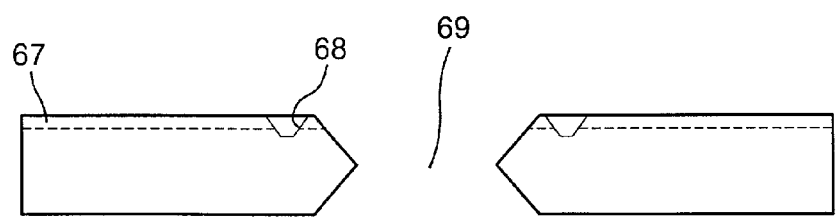
Figure 4A:
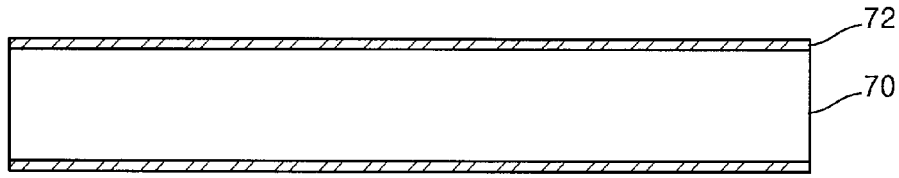
FIGS. 4A through 4D illustrate the process of manufacturing the conventional optical module.
Figure 4B:
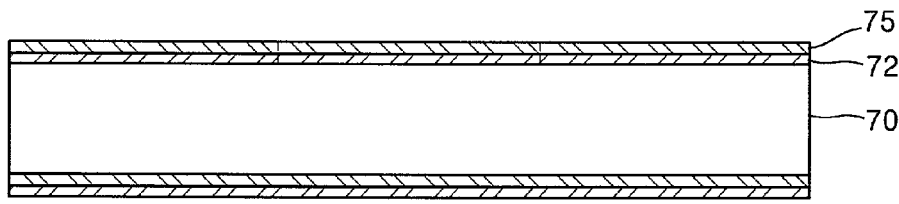
Figure 4C:
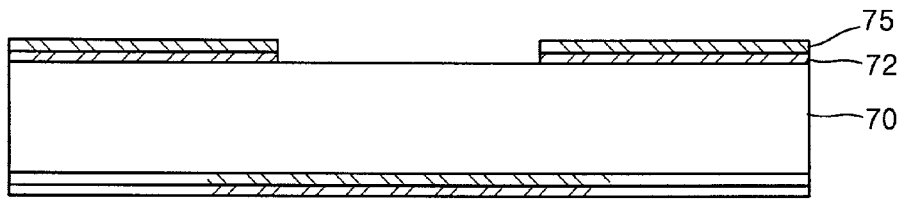
Figure 4D:
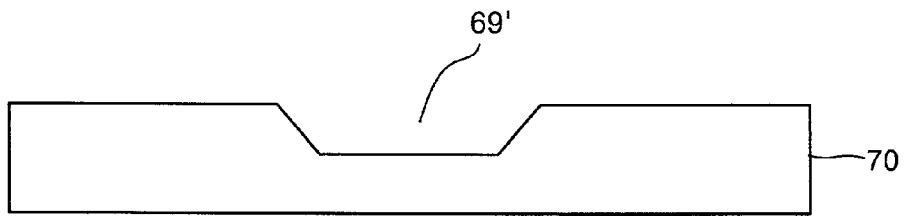
Figure 5A:
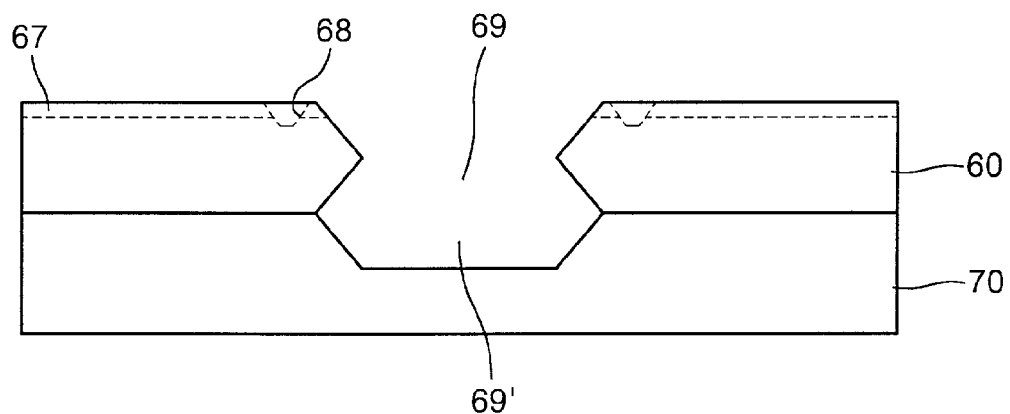
FIGS 5A and 5B illustrate the process of manufacturing the conventional optical module.
Figure 5B:
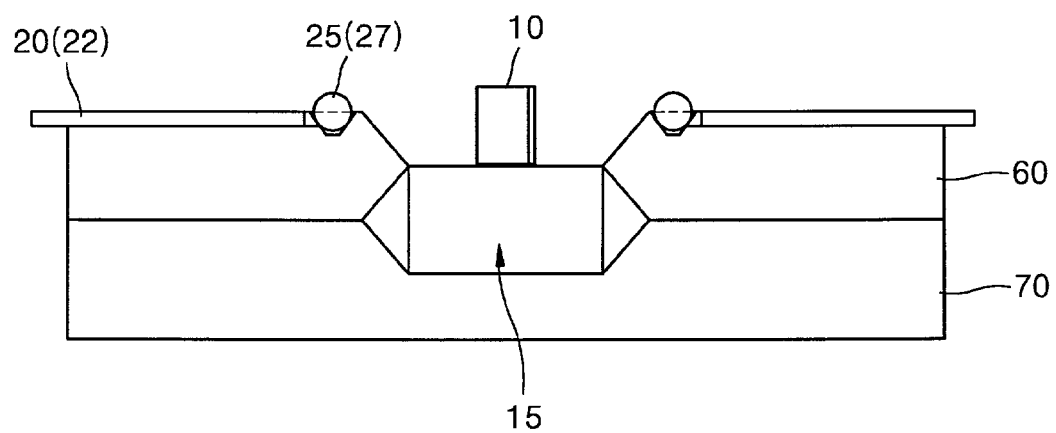
Figure 6:
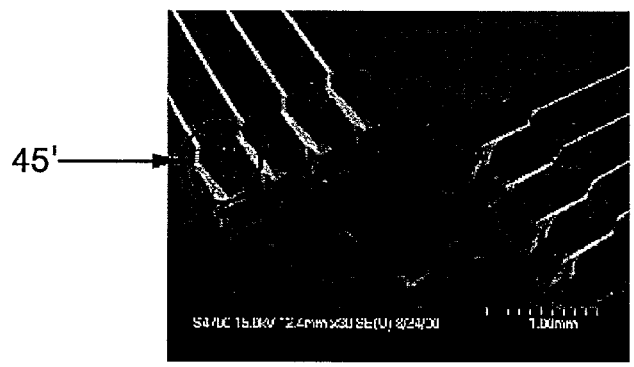
FIG. 6 is a scanning electronic microscope (SEM) photo illustrating a damaged convex corner of the conventional optical module.
Figure 7:
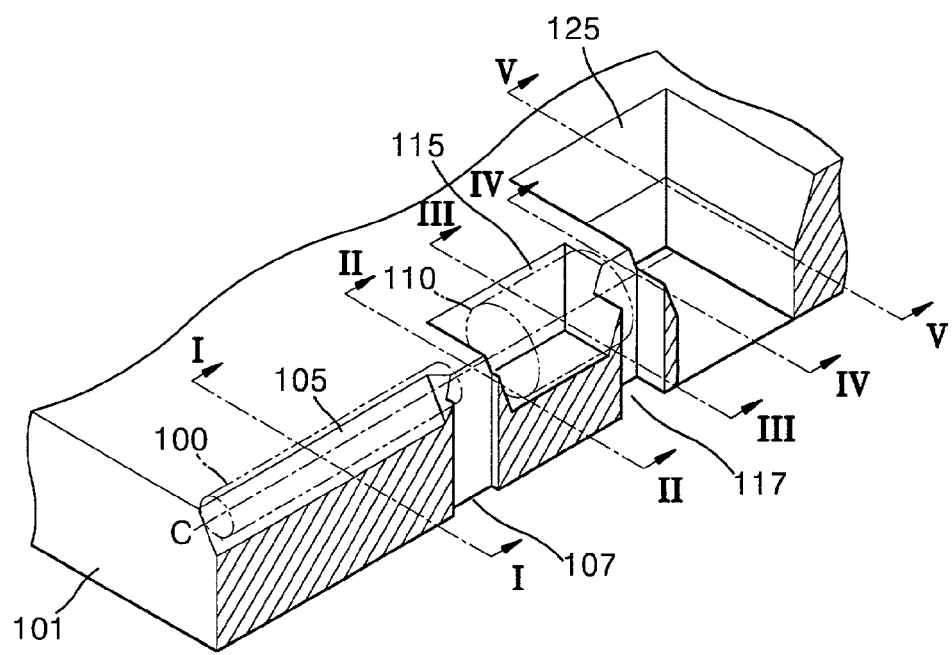
FIG. 7 is partial cutaway perspective view of an optical module according to the present invention.

FIG. 7 is a partial cutaway perspective view of an optical module according to the present invention. Referring to FIG. 7, the optical module includes one or more grooves of different depths in a substrate 101. The grooves include, for example, a V-groove 105 for mounting an optical fiber 100 on the substrate 101, a micro-pit 115 for mounting optical parts 110 such as a green lens or ball lens, on the substrate 101, and a hole 125 in which an actuator (not shown) is installed.

A first stopper hole 107 having a width smaller than that of the V-groove 105 is formed between the V-groove 105 and the micro-pit 115. A second stopper hole 117 having a width smaller than that of the micro-pit 115 is formed between the micro-pit 115 and the hole 125. The first and second stopper holes 107 and 117 should be stably mounted without the optical fiber 105 and the optical parts such as a green lens or a ball lens, being moved. Also, the V-groove 105, the micro-pit 115, and the hole 125 communicate with one another through the first and second stopper holes 107 and 117. Thus, an optical signal transmitted through the optical fiber 100 received in the V-groove 105 passes through an upper portion of the first stopper hole 107, through the optical parts 110 in the micro-pit 115 and is transmitted into an actuator (not shown) without any obstacle through an upper portion of the second stopper hole 117.

Hereinafter, a method of manufacturing the optical module according to a preferred embodiment of the present invention will be described.

Figure 8A:
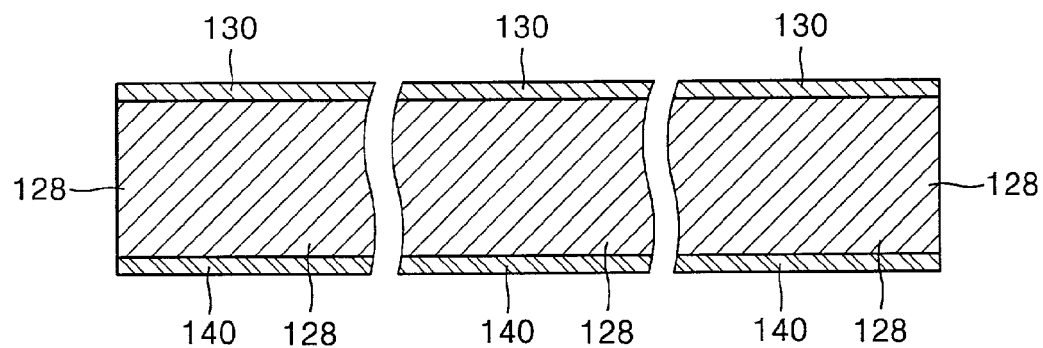
FIGS. 8A, 8B, and 8D illustrate the process of manufacturing an optical module according to a first embodiment of the present invention with reference to views taken along lines I—I, III—III, and V—V of FIG. 7.
Figure 8B:
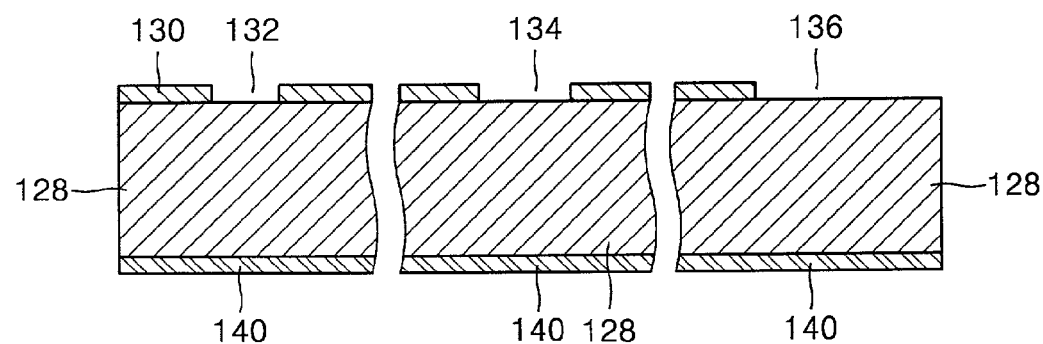
Figure 8C:
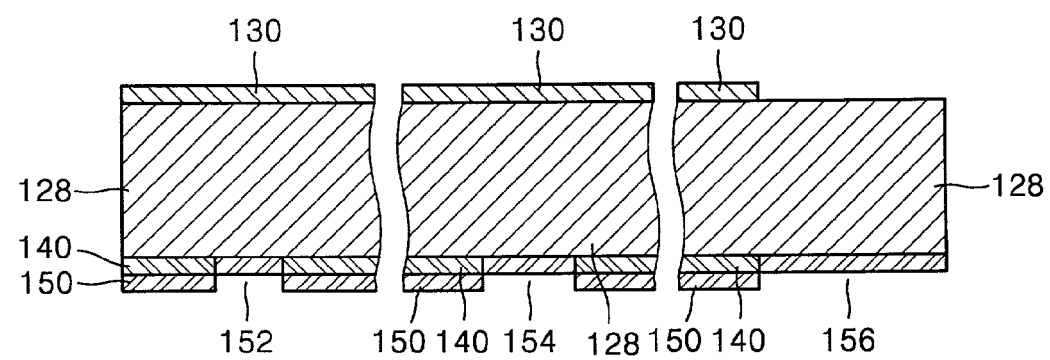
FIGS. 8C and 8E illustrate the process of manufacturing an optical module according to the first embodiment of the present invention with reference to views taken along lines II—II, IV—IV, and V—V of FIG. 7.
Figure 8D:
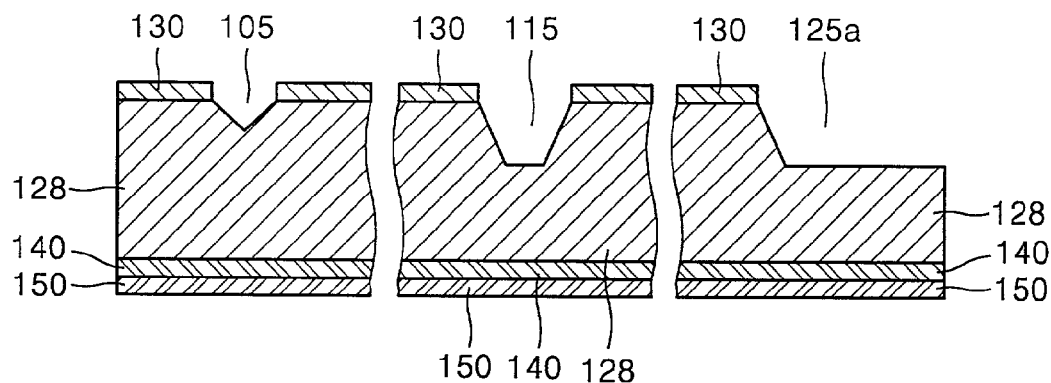
Figure 8E:
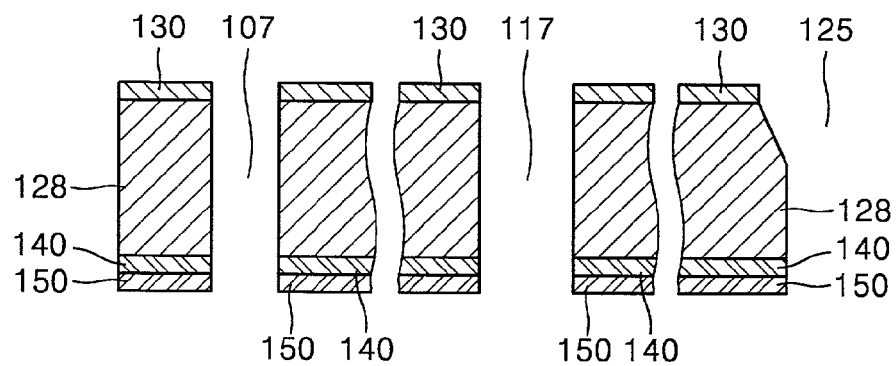

FIGS. 8A, 8B, and 8D illustrate the process of manufacturing an optical module according to a first embodiment of the present invention with reference to views taken along lines I—I, III—III, and V—V of FIG. 7. FIGS. 8C and 8E illustrate the process of manufacturing an optical module according to the first embodiment of the present invention with reference to views taken along lines II—II, IV—IV, and V—V of FIG. 7.

The method of manufacturing the optical module according to a first embodiment of the present invention includes the step of coating first etching mask layers 130 and 140 on first and second surfaces of a wafer 128, as shown in FIG. 8A. The first and second surfaces of the wafer 128 denote the top surface of the wafer 128 and the bottom surface of the wafer 128, respectively. A silicon wet etching mask layer 130 using silicon nitride ($Si_3N_4$) or silicon dioxide ($SiO_2$) can be deposited on the top surface of the wafer 128, and a dry etching mask layer 140 using $SiO_2$ aluminum (Al), or a photoresist layer can be deposited on the bottom surface of the wafer 128. Otherwise, a wet etching mask layer can be deposited on both the top and bottom surfaces of the wafer 128.

Next, the first etching mask layer 130 on the top surface of the wafer 128 is first patterned by an exposure process and a reactive ion etching (RIE) process, as shown in FIG. 8B. A V-groove area 132 for mounting an optical fiber, a micro-pit area 134 for mounting optical parts such as a green lens or a ball lens, and a hole area 136 for assembling an actuator are formed as a first pattern. As shown in FIG. 8C, the first etching mask layer 140 on the bottom surface of the wafer 128 is second patterned, thereby forming a first stopper hole area 152, a second stopper hole area 154, and a hole area 156 and depositing a wet etching mask layer 150 as a second etching mask layer, on the first stopper hole area 152, the second stopper hole area 154, and the hole area 156.

Surfaces 132, 134, and 136 which are exposed by the first pattern as shown in FIG. 8B, are first etched. For example, wet etching is performed by a KOH, $NH_4OH$ or $(CH_3)_4NOH$ aqueous solution, thereby forming the V-groove 105, the micro-pit 115, and a hole 125a (see FIG. 8D). The etching depth is determined in consideration of the diameter of the optical parts 110 such as a green lens or a ball lens, and the location of an optical axis C. Then, the etching depth of the V-groove 105 is determined by its width, and thus, the V-groove 105 is etched to a predetermined depth, and the micro-pit 115 for mounting the optical parts wider than the V-groove 105 is continuously etched deeper than the V-groove 105.

Next, second etching is performed by one or more selected from dry etching, sand blasting, and laser drilling, using second patterns 152, 154, and 156 as shown in FIG. 8C. The dry etching may be for example, the RIE process. As shown in FIG. 8E, the bottom surface of the wafer 128 is first etched to penetrate the top surface of the wafer 128, thereby forming a first stopper hole 107, a second stopper hole 117, and a hole 125 for assembling an actuator.

Here, the order of the step of first etching and second etching may be changed. That is, after the bottom surface of the wafer 128 is first etched to penetrate the top surface of the wafer 128 and the first stopper hole 107 and the second stopper hole 117 are formed, one or more grooves for mounting optical parts on the top surface of the wafer 128 can be formed.

Hereinafter, a method of manufacturing the optical module according to a second embodiment of the present invention will be described.

Figure 9A:
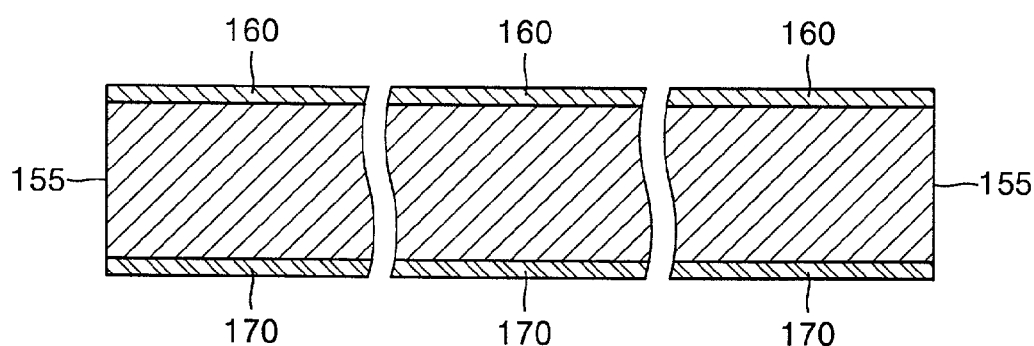
FIGS. 9A, 9B, and 9D illustrate the process of manufacturing an optical module according to a second embodiment of the present invention with reference to views taken along lines I—I, III—III, and V—V of FIG. 7.
Figure 9B:
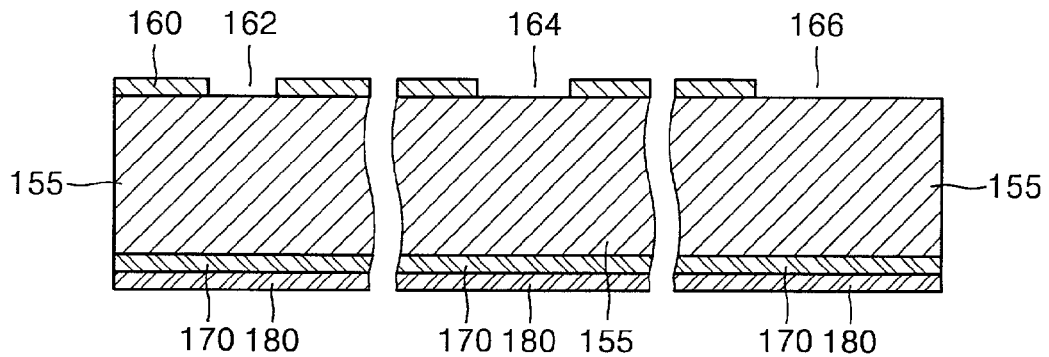
Figure 9C:
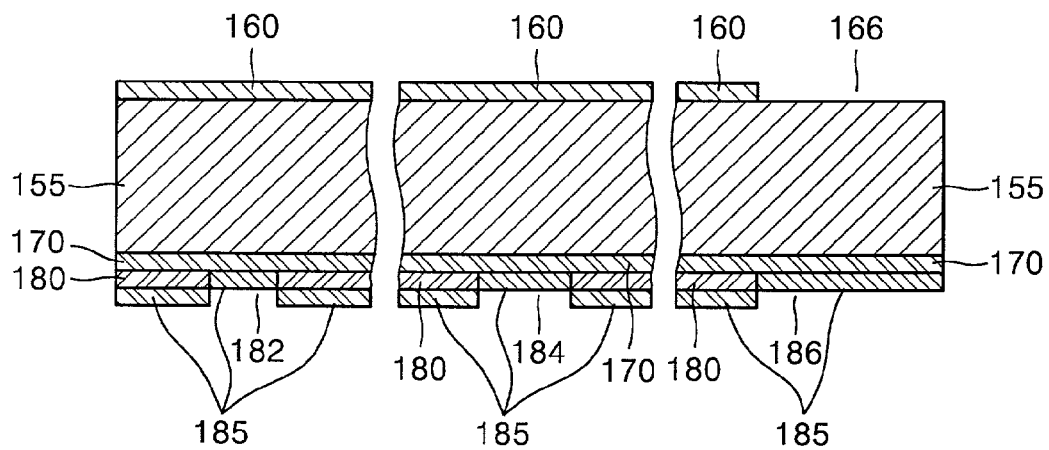
FIGS. 9C and 9E illustrate the process of manufacturing an optical module according to the second embodiment of the present invention with reference to views taken along lines II—II, IV—IV, and V—V of FIG. 7.
Figure 9D:
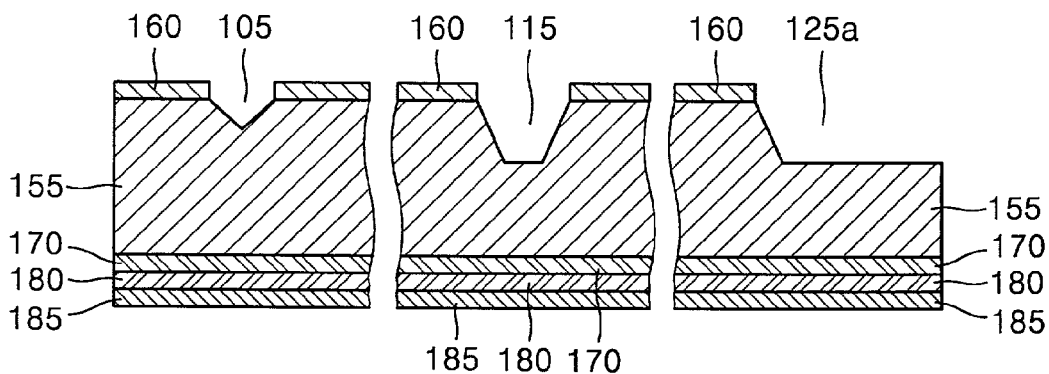
Figure 9E:
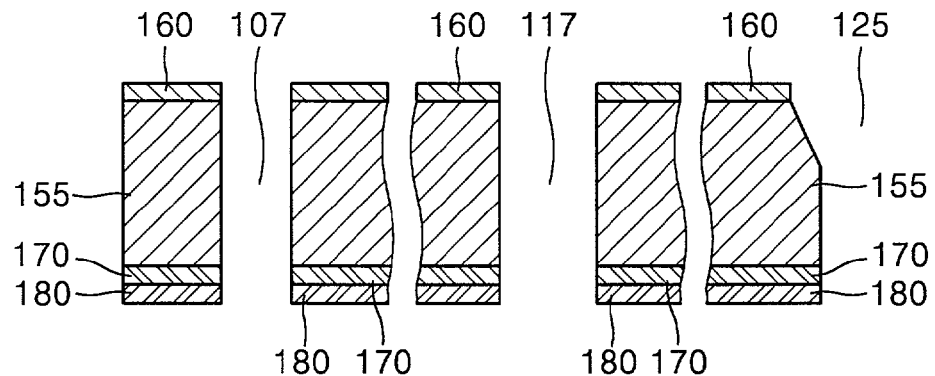

FIGS. 9A, 9B, and 9D illustrate the process of manufacturing an optical module according to a second embodiment of the present invention with reference to views taken along lines I—I, III—III, and V—V of FIG. 7. FIGS. 9C and 9E illustrate the process of manufacturing an optical module according to the second embodiment of the present invention with reference to views taken along lines II—II, IV—IV, and V—V of FIG. 7.

As shown in FIGS. 9A and 9B, first etching mask layers 160 and 170 are deposited respectively on the top and bottom surfaces of a wafer 155, and a second etching mask layer 180 is coated on the first etching mask layer 170 on the bottom surface of the wafer 155. The first etching mask layers 160 and 170 are wet etching mask layers, and the second etching mask layer 180 may be a mask layer for deep-reactive ion etching (DRIE).

Next, the first etching mask layer 160 on the top surface of the wafer 155 is patterned to form a first pattern by an exposure process and a RIE process, thereby forming a V-groove area 162, a micro-pit area 164, and a hole area 166. Next, the second etching mask layer 180 on the bottom surface of the wafer 155 is patterned to form a second pattern, thereby forming first and second stopper hole areas 182 and 184, and a hole area 186.

As shown in FIG. 9C, a third etching mask layer 185 is deposited on a second pattern on the bottom surface of the wafer 155. The third etching mask layer 185 is a wet etching mask layer. As shown in FIG. 9D, wet etching is performed on the top surface of the wafer 155 according to the first pattern, thereby forming a V-groove 105 and a micro-pit 115. Next, as shown in FIG. 9C, the third etching mask layer 185 is removed, and the second pattern is etched by deep reactive ion etching (DRIE) process, penetrating from the bottom surface to the top surface of the wafer 128. As a result, a first stopper hole 107, a second stopper hole 117, and a hole 125 for assembling an actuator are formed (see FIG. 9E).

Here, the first etching mask layer 160 on the top surface of the wafer 155 may be formed of $SiO_2$ or $Si_xN_y$, for example, $Si_3N_4$, and the second etching mask layer 180 as an etching mask for a silicon dry etching process, may be formed of $SiO_2$, Al, or a photoresist.

Meanwhile, in the first and second embodiments, when first etching, that is, when silicon wet etching, a protective jig or passivation can be coated on the bottom surface of the wafers 128 and 155 instead of the wet etching mask layers 150 and 185.

A method of manufacturing an optical module according to a third embodiment of the present invention includes the steps of patterning a V-groove area for mounting optical fiber on a top surface of a wafer and a micro-pit area for mounting optical parts to form a first pattern and perform first etching, and patterning first and second stopper hole areas and a hole are for assembling an actuator on the top surface of the wafer to form a second pattern and perform second etching. The step of first patterning and first etching is performed like in the first and second embodiments, and thus, a detailed description of first patterning and first etching will be omitted.

Figure 10A:
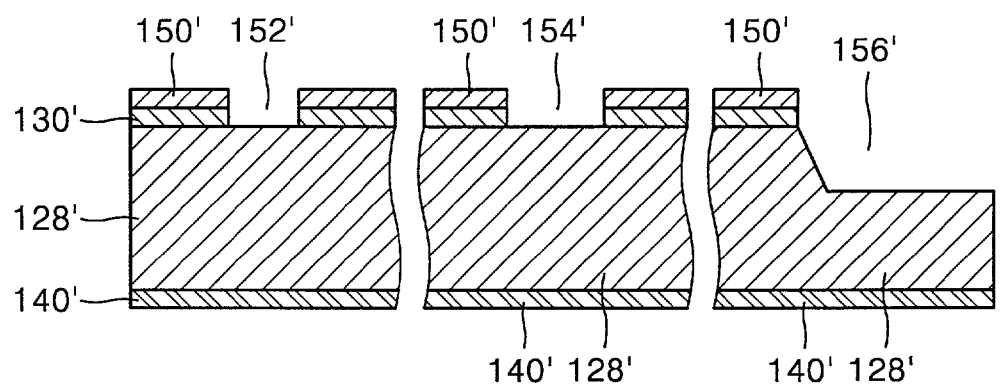
FIGS. 10A and 10B illustrate the process of manufacturing an optical module according to a third embodiment of the present invention with reference to views taken along lines II—II, IV—IV, and V—V of FIG. 7.
Figure 10B:
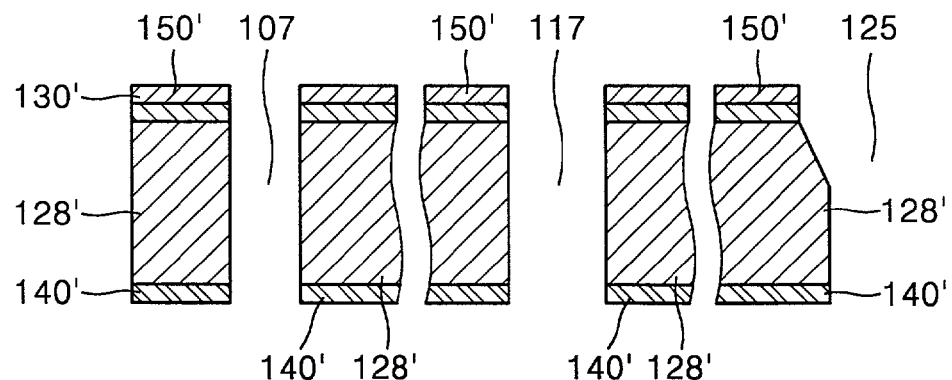

FIGS. 10A and 10B illustrate the process of manufacturing an optical module according to a third embodiment of the present invention with reference to views taken along lines II—II, IV—IV, and V—V of FIG. 7. First etching mask layers 130' and 140' are deposited respectively on the top and bottom surfaces of a wafer 128'. After the first etching mask layers 130' and 140' are first etched, a second etching mask layer 150' is deposited on the first etching mask layer 130' on the top surface of the wafer 128'. Next, as shown in FIG. 10A, the second etching mask layer 150' is second etched, thereby forming first and second stopper hole areas 152' and 154', and a hole area 156'. The second etching mask layer 150' is etched according to the second pattern by a dry etching process from the top surface of the wafer 128', thereby forming first and second stopper holes 107 and 117.

The first and second stopper holes 107 and 117 penetrate the wafer 128' (see FIG. 10B). Also, in case of second etching from the top surface of the wafer 128', the wafer 128' may be etched only to a predetermined depth instead of penetrated. Thus, as shown in FIG. 7, when an optical signal is transmitted into the optical parts 110 such as a green lens or a ball lens, through the optical fiber 100, or is transmitted from the optical parts 110 into an actuator (not shown), the optical signal can be transmitted without being stopped or disturbed by the first and second stopper holes 107 and 117.

Also, in the first, second, and third embodiments, before second etching, the method of manufacturing the optical module further includes the step of depositing aluminum (Al), oxide, or a photoresist on the top surface of the wafers 128 and 155, thereby preventing damage to a groove 105 or a micro-pit 115 on the top surface of the wafer which can be etched by a deep-reactive ion gas, in which part of the top surface of the wafer is penetrated when second etching from the bottom surface of the wafer, that is, when performing a deep-reactive ion etching (DRIE) process.

Also, in the first, second, and third embodiments, the order of the step of first etching as wet etching and the step of second etching as dry etching may be changed. That is, in order to achieve optical transmission in the present invention, after stopper holes are preformed by dry etching from the top surface or the bottom surface of the wafer, a V-groove area, a micro-pit area, and a hole area can be formed by wet etching.

Also, the stopper holes include at least a first stopper hole formed between the V-groove and the micro-pit, and a second stopper hole formed between the micro-pit and the hole. Each stopper hole is used to fix optical parts and allows smooth optical transmission.

As described above, in the optical module and manufacturing method thereof according to the present invention, first patterning, second patterning, and first and second etching are performed independently, and thus, a convex corner phenomenon does not occur. Likewise, no mask compensation pattern is needed to compensate for the convex corner effect, thereby minimizing the optical path of optical input/output terminals. As a result, optical loss can be minimized, a plurality of input/output channels can be formed, and the input/output channels can be integrated. Also, the V-groove and the micro-pit for mounting optical parts can be formed so that the convex corner phenomenon does not occur even in complex convex corners where a compensation pattern cannot be applied, and thus, there is no limitation to the scope of application.

Further, the number of wet etching processes is reduced to one, removing optical property errors caused by mask layer registration, and improving the reliability of transmission of the optical signal.

Figure 11:
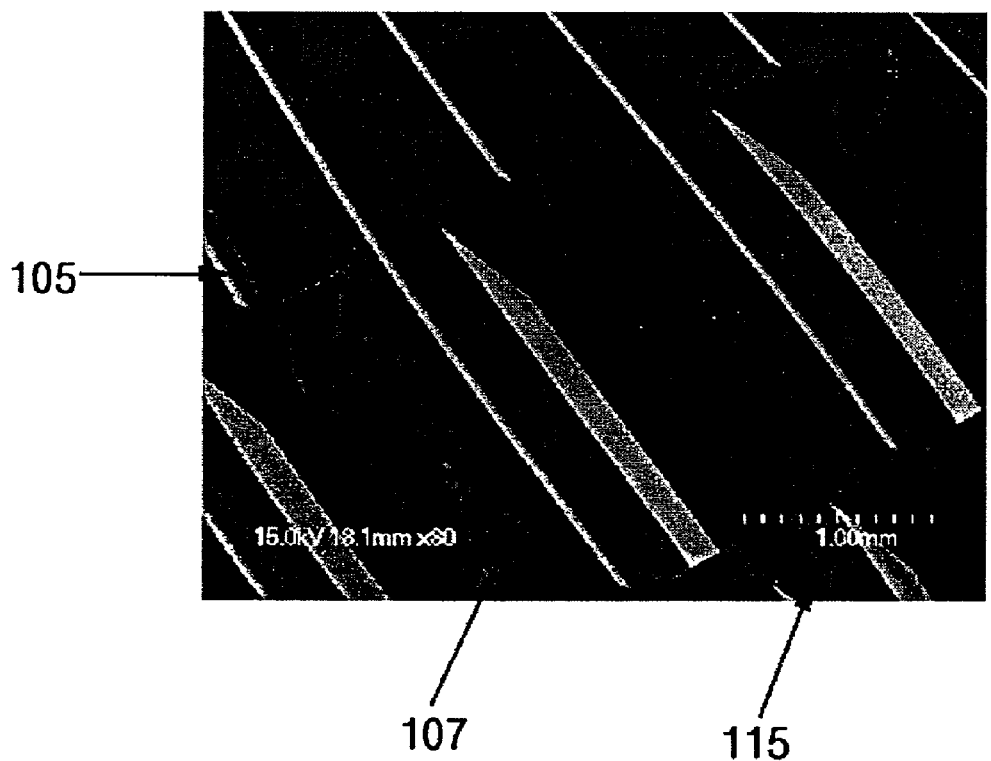
FIG. 11 is a SEM photo of an optical bench of the optical module according to the present invention.

FIG. 11 is an SEM photo of an optical bench of the optical module according to the present invention. The patterns of the convex corner centering the stopper hole are precisely formed as designed. Reference numerals 105, 107, and 115 denote a V-groove, a first stopper, and a micro-pit, respectively.

While this invention has been particularly shown and described with reference to preferred embodiments thereof, it will be understood by those skilled in the art that various changes in form and details may be made therein without departing from the spirit and scope thereof as defined by the appended claims.

What is claimed is:

1. A method of manufacturing an optical module comprising:
   first etching to form at least one groove in a first surface of a wafer, and to form a micro-pit area for mounting an optical part; and
   second etching on a second surface of the wafer to form at least one stopper hole that penetrates from the second surface to the first surface of the wafer and is in communication with the at least one groove.

2. The method as claimed in claim 1, further comprising the steps of:
   depositing first etching mask layers on the first and second surfaces of the wafer;
   patterning one or more groove areas on the first etching mask layer on the first surface of the wafer, to form a first pattern;
   said first etching including etching the first pattern from the first surface of the wafer according to the first pattern;
   depositing a second etching mask layer on the second surface of the wafer and patterning at least one stopper hole area to form a second pattern; and said second etching including etching the second pattern so that the second surface of the wafer is etched to penetrate the wafer according to the second pattern.

3. A method of manufacturing an optical module comprising:
   first etching to form at least one groove in a first surface of a wafer;
   second etching on a second surface of the wafer to form at least one stopper hole that penetrates from the second surface to the first surface of the wafer;
   depositing first etching mask layers on the first and second surfaces of the wafer;
   patterning one or more groove areas on the first etching mask layer on the first surface of the wafer, to form a first pattern;
   said first etching including etching the first pattern from the first surface of the wafer according to the first pattern;
   depositing a second etching mask layer on the second surface of the wafer and patterning at least one stopper hole area to form a second pattern; and
   said second etching including etching the second pattern so that the second surface of the wafer is etched to penetrate the wafer according to the second pattern,
   wherein a V-groove area for mounting an optical fiber, a micro-pit area for mounting optical parts, and a hole area for assembling an actuator are exposed by patterning, in the step of patterning to form a first pattern.

4. The method as claimed in claim 3, wherein the V-groove area, the micro-pit area, and the hole area are etched to different depths, in the step of first etching.

5. The method as claimed in claim 4, wherein the first etching mask layers are formed of silicon dioxide ($SiO_2$) or silicon nitride ($Si_3N_4$).

6. The method as claimed in claim 4, wherein the second etching mask layer is formed of silicon dioxide ($SiO_2$), aluminum (Al), or a photoresist.

7. The method as claimed in claim 2, wherein the first etching is wet etching selectively using KOH, $NH_4OH$, or $(CH_3)_4NOH$.

8. The method as claimed in claim 7, wherein the second etching is performed by at least one selected from dry etching, sand blasting, and laser drilling.

9. The method as claimed in claim 2, wherein a wet etching mask layer is further deposited on the second etching mask layer.

10. The method as claimed in claim 2, further comprising, before second etching, the step of depositing Al or oxide or a photoresist on the first surface of the wafer.

11. The method as claimed in claim 3, wherein the first etching mask layers are formed of silicon dioxide ($SiO_2$) or silicon nitride ($Si_3N_4$).

12. The method as claimed in claim 11, wherein the second etching mask layer is formed of one of silicon dioxide ($SiO_2$), aluminum (Al), and a photoresist.

13. A method of manufacturing an optical module comprising:
    first etching to form at least one groove on a first surface of a wafer, and to form a micro-pit area for mounting an optical part; and
    second etching on the first surface of the wafer to form at least one stopper hole that penetrates from the first surface to a second surface of the wafer and is in communication with the at least one groove.

14. A method of manufacturing an optical module comprising:
    first etching to form at least one stopper hole so that a bottom surface of a wafer is etched to penetrate the wafer; and
    second etching to form at least one groove for mounting at least one optical element on a top surface of the wafer so that the at least one groove is in communication with the at least one stopper hole, the second etching also forming a micro-pit area for mounting an optical part that is separate from the at least one optical element.

15. The method as claimed in claim 1, wherein the at least one groove and the micro-pit are etched so as to be separated by the at least one stopper hole.

16. The method as claimed in claim 13, wherein the at least one groove and the micro-pit are etched so as to be separated by the at least one stopper hole.

17. The method as claimed in claim 14, wherein the at least one groove and the micro-pit are etched so as to be separated by the at least one stopper hole.

* * * * *